United States Patent
Duong et al.

(10) Patent No.: US 9,382,733 B2
(45) Date of Patent: Jul. 5, 2016

(54) LATCH ALIGNMENT JIG

(71) Applicant: Toyota Motor Engineering & Manufacturing North America, Inc., Erlanger, KY (US)

(72) Inventors: Huy Kyle Duong, Lexington, KY (US); Jeremy Lynn Fraley, Georgetown, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 198 days.

(21) Appl. No.: 14/016,562

(22) Filed: Sep. 3, 2013

(65) Prior Publication Data

US 2015/0059155 A1    Mar. 5, 2015

(51) Int. Cl.
| | |
|---|---|
| *B60J 5/04* | (2006.01) |
| *G01B 5/14* | (2006.01) |
| *E05B 79/04* | (2014.01) |
| *E05B 17/06* | (2006.01) |
| *E05B 17/00* | (2006.01) |
| *B23Q 3/18* | (2006.01) |
| *B23P 19/04* | (2006.01) |

(52) U.S. Cl.
CPC .............. *E05B 79/04* (2013.01); *B60J 5/0463* (2013.01); *E05B 17/06* (2013.01); *B23P 19/04* (2013.01); *B23Q 3/186* (2013.01); *E05B 17/0004* (2013.01); *Y10T 29/49778* (2015.01); *Y10T 29/49826* (2015.01); *Y10T 29/49895* (2015.01); *Y10T 29/49901* (2015.01); *Y10T 29/49902* (2015.01); *Y10T 29/53913* (2015.01); *Y10T 29/53978* (2015.01)

(58) Field of Classification Search
CPC ..... E05B 79/04; E05B 17/0004; E05B 17/06; B60J 5/0463; B23Q 3/186; Y10T 29/53913; Y10T 29/53978; Y10T 29/49901; Y10T 29/49826; Y10T 29/49778; Y10T 29/49895; Y10T 29/49902; B23P 19/04
See application file for complete search history.

(56) References Cited

U.S. PATENT DOCUMENTS

| | | | |
|---|---|---|---|
| 5,282,305 A | 2/1994 | Nutt et al. | |
| 6,138,337 A | 10/2000 | Lezuch et al. | |
| 6,324,948 B1 * | 12/2001 | Kavc | ................... B25B 27/0035 29/271 |
| 8,220,122 B2 | 7/2012 | Lee et al. | |

FOREIGN PATENT DOCUMENTS

DE          19717906 B4    10/2005

* cited by examiner

*Primary Examiner* — John C Hong
(74) *Attorney, Agent, or Firm* — Christopher G. Darrow; Darrow Mustafa PC

(57) ABSTRACT

A jig includes a plate with at least one jig aperture which defines a jig aperture axis; a striker defined along a striker axis generally parallel to the aperture axis; and a bias member movable relative to the striker axis. A method of mounting a latch mechanism to a door of a vehicle, the door includes a multiple of latch mechanism apertures, includes mounting a jig to the latch mechanism, the jig biased with respect to the door to align a multiple of jig apertures with the multiple of latch mechanism apertures.

20 Claims, 8 Drawing Sheets

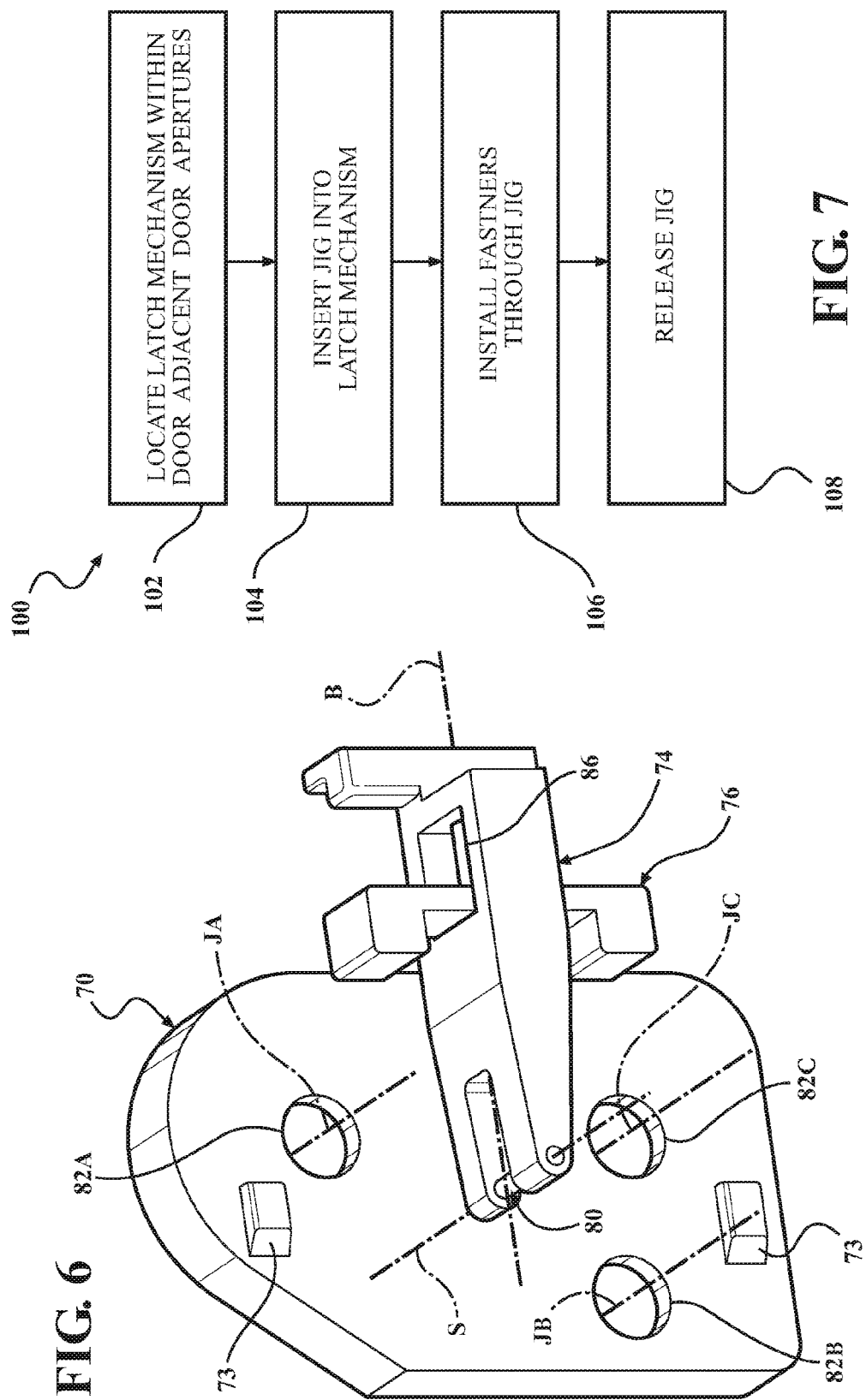

LATCH ALIGNMENT JIG

BACKGROUND

The present disclosure relates generally to automotive tooling and more particularly to a latch alignment jig for attachment of a latch mechanism within a vehicle door.

Vehicle closures such as a door typically include a latch mechanism engageable with a striker structure on the vehicle body and operated by a door handle. In an assembly line environment, door latch alignment jigs are often utilized to facilitate assembly and minimization of scratches and other aesthetic damage to the vehicle finish.

Oftentimes, however, the latch mechanism is movable within the door when under assembly such that the latch mechanism and the alignment jig must be manually positioned prior to fastener engagement to prevent aesthetic damage to the vehicle finish. Although effective, this manual alignment requires that the latch mechanism be manually aligned within the door to align the latch mechanism fastener holes with the door fastener holes. The alignment jig must also be manually aligned on the outside of the door to align its jig holes with door fastener holes. The fasteners are then installed though the jig holes.

This manual alignment, however, is quite dependent upon the skill and experience of the assembler. The manual alignment may not only complicate assembly but may increase the potential for inadvertent scratches and other aesthetic damage to the vehicle finish as the fasteners are sometimes used to align the jig holes with the door fastener holes and the latch mechanism.

SUMMARY

A jig according to one disclosed non-limiting embodiment of the present disclosure includes a plate with at least one jig aperture that defines a jig aperture axis; a striker defined along a striker axis generally parallel to the aperture axis; and a bias member movable relative to the striker axis.

A method of mounting a latch mechanism to a door of a vehicle, the door includes a multiple of door apertures, according to another disclosed non-limiting embodiment of the present disclosure includes mounting a jig to the latch mechanism, the jig biased with respect to the door to align a multiple of jig apertures with the multiple of door apertures.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 6 is an assembly view of the jig of FIG. 5;

FIG. 7 shows a method of installing the latch mechanism with the jig of FIGS. 5 and 6;

DETAILED DESCRIPTION

Figure 1:
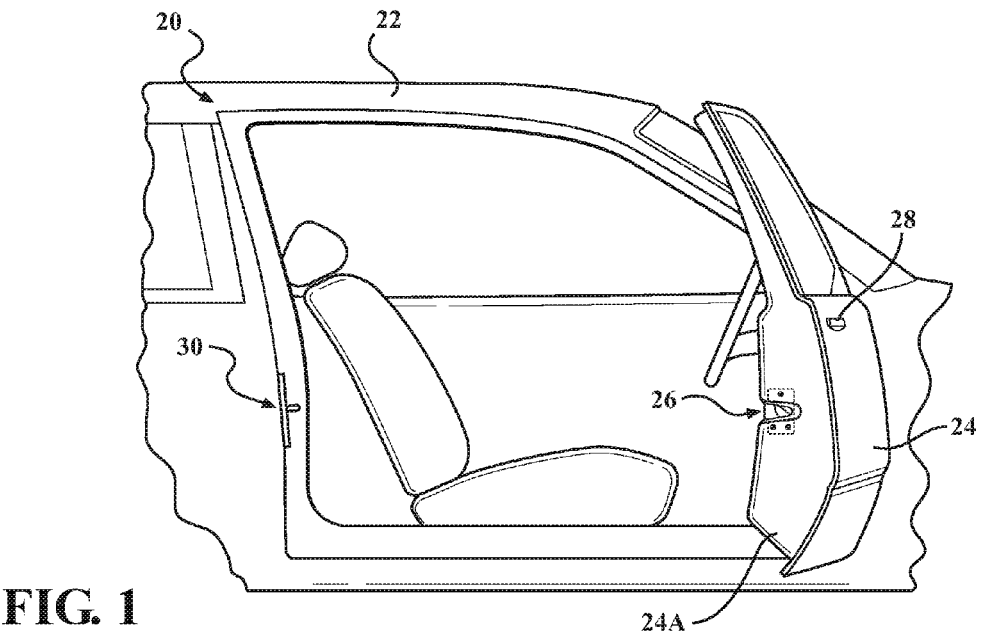
FIG. 1 is a schematic view of a vehicle with a door having a latch mechanism and a body with a striker structure.

FIG. 1 schematically illustrates selected portions of a vehicle 20. The vehicle 20 generally includes a body 22 with a door 24 pivotable relative to the body 22 as generally understood. The door 24 typically includes a latch mechanism 26 (also shown in FIG. 2) operated by a door handle 28 and engageable with a striker structure 30 (also shown in FIG. 3) on the body 22. Although a passenger door is illustrated in the disclosed non-limiting embodiment, it should be appreciated that other doors, lift gates, hatches and other closure members which utilize a latch mechanism 26 will also benefit herefrom.

Figure 2:
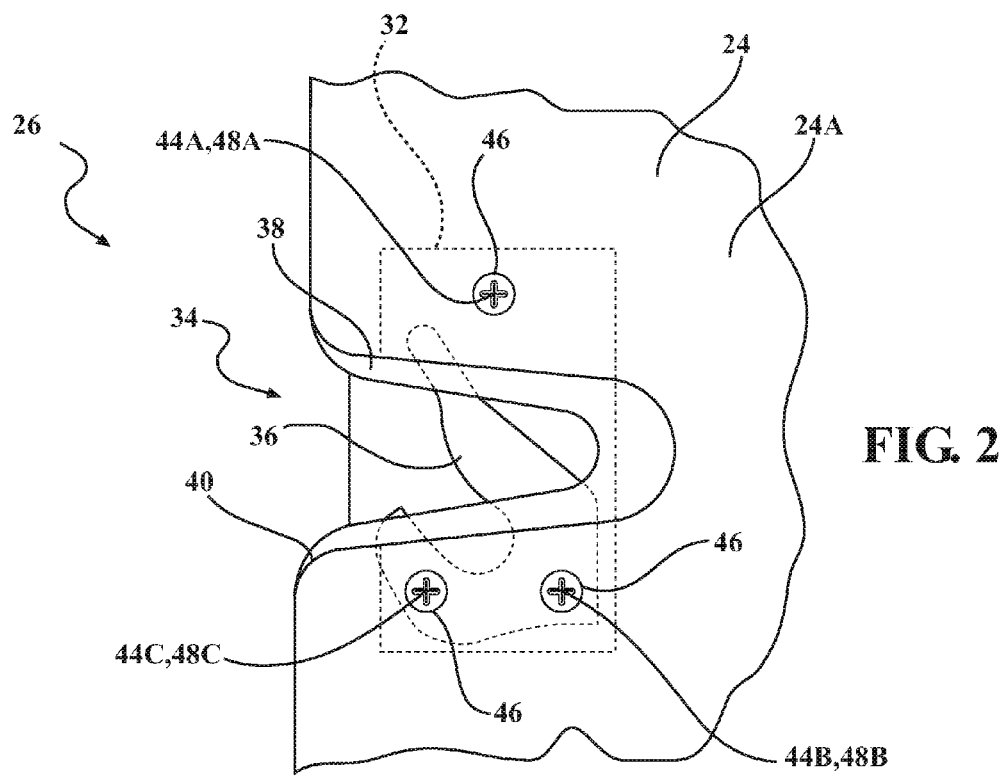
FIG. 2 is an expanded schematic perspective view of a vehicle door with a latch mechanism mounted thereto.
Figure 3:
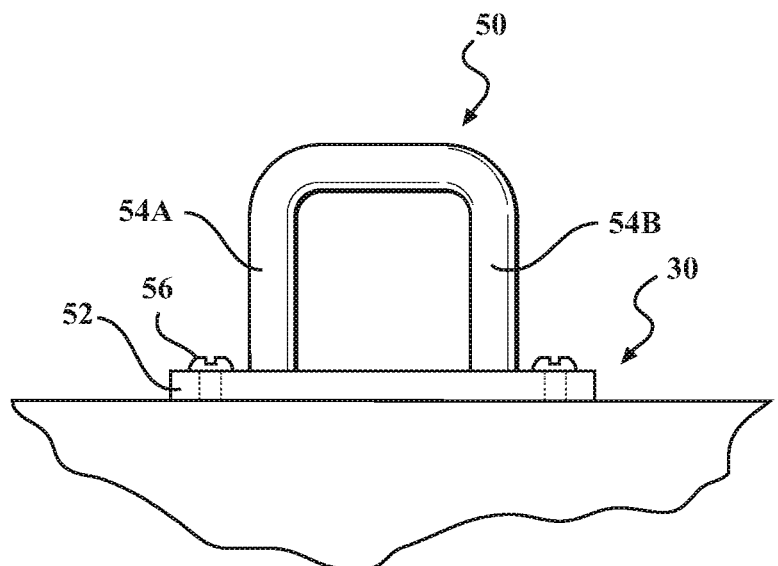
FIG. 3 is an expanded schematic perspective view of a striker structure engageable by the latch mechanism of FIG. 2.

With reference to FIG. 2, the latch mechanism 26 generally includes a housing 32, a guide chute 34 and a latch ratchet 36. The guide chute 34 is at least partially defined by the housing 32 and includes a pair of opposed tapered guide surfaces 38 to receive the striker structure 30 into the latch ratchet 36. The latch ratchet 36 defines a striker aperture 40 to receive striker structure 30 (FIG. 3). It should be appreciated that latch mechanism 26 may have more, less, or different components than those which are schematically illustrated.

Figure 4:
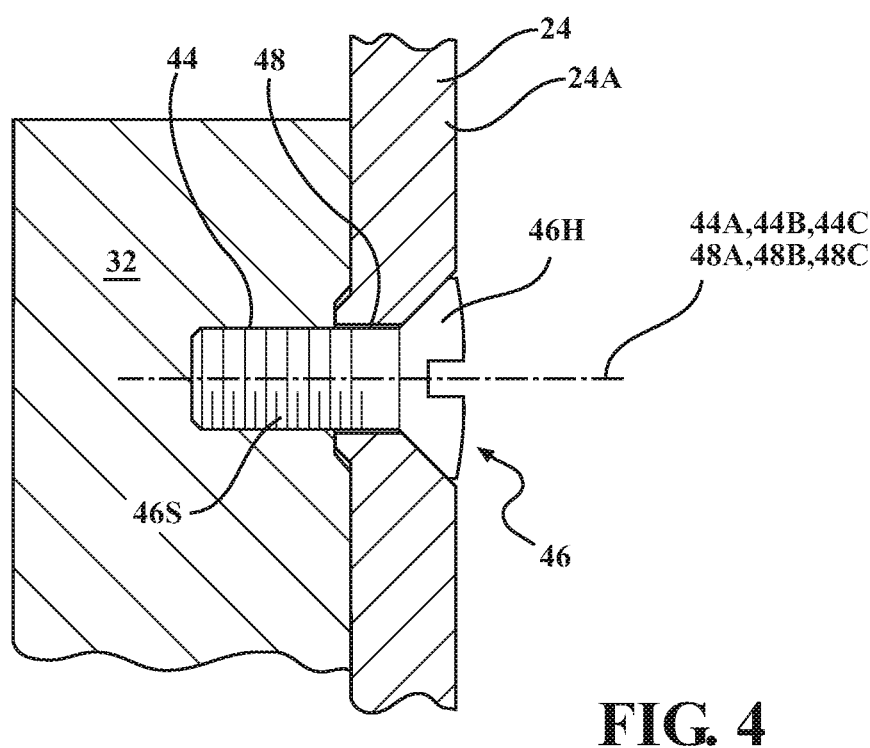
FIG. 4 is a schematic sectional view of the vehicle door through a fastener which retains the latch mechanism.

The housing 32 includes a multiple of latch mechanism apertures 44 (three shown along respective latch mechanism aperture axes 44A, 44B, 44C) which permit the housing 32 to be mounted to a wall 24A of the door 24 through fasteners 46 such as bolts. The fasteners 46 are received through corresponding door apertures 48 (three shown along respective door aperture axes 48A, 48B, 48C) in the wall 24A. That is, the latch mechanism apertures 44 in the housing 32 are threaded to receive the fasteners 46 while the door apertures 48 are essentially holes through which a shank 46S of each fastener 46 may pass to sandwich the wall 24A between the housing 32 and a head 46H of each fastener 46 (FIG. 4).

The latch ratchet 36 is rotationally coupled to the housing 32 and is movable between an unlatched condition (shown schematically) and a latched condition. The unlatched condition aligns the latch ratchet 36 such that the striker structure 30 may be introduced therein to operate the latch mechanism 26 to the latched condition secures the striker structure 30 (FIG. 3).

With reference to FIG. 3, the striker structure 30 generally includes a striker member 50 and a mount plate 52. The striker member 50 is generally U-shaped and fixedly coupled to the mount plate 52 such that the legs 54A, 54B extend perpendicularly outwardly with respect to the mount plate 52. The mount plate 52 is coupled to the body 22 through fasteners 56 such as bolts. When the door 24 is closed, the striker member 50 enters the guide chute 34 such that the leg 54A engages the latch ratchet 36. The latch ratchet 36 is rotated by the leg 54A to capture the leg 54A and thereby latch the door 24 to the body 22. It should be appreciated that various other latch engagement interfaces and mechanisms may alternatively be utilized.

Figure 5:
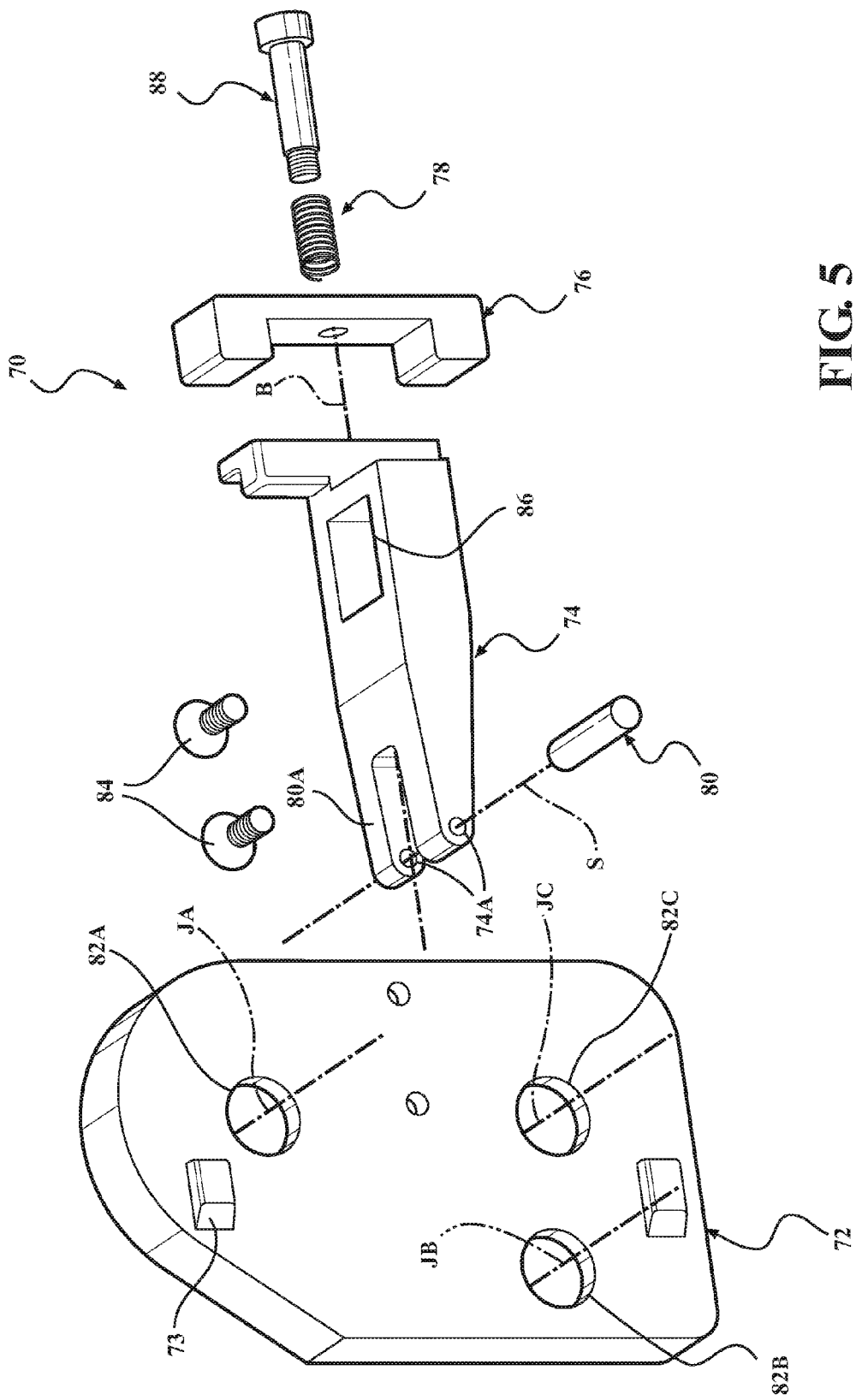
FIG. 5 is an exploded view of a jig to mount the latch mechanism to the vehicle door according to one disclosed non-limiting embodiment.

With reference to FIG. 5, a jig 70 generally includes a plate 72, a striker body 74, a bias member 76, a spring 78 and a striker 80 (shown assembled in FIG. 6). The plate 72, the striker body 74 and the bias member 76 may be manufactured of a non-metallic material to minimize scratching and aesthetic damage to the vehicle finish while the spring 78 and the striker 80 may be a metal alloy. Further, the plate 72 may be manufactured of a relatively clear material to facilitate alignment verification.

The plate 72 includes a multiple of jig apertures 82A, 82B, 82C each along a respective jig aperture axis JA, JB, JC that correspond with the geometric arrangement of the multiple of latch mechanism apertures 44 and door apertures 48 (FIG. 4). The jig apertures 82A, 82B, 82C define an aperture diameter greater than a diameter of the fastener head 46H to allow passage therethrough. It should be appreciated that various numbers and geometric arrangements may benefit herefrom that correspond to the component to which the jig 70 is to be mounted.

The plate 72 may also include one or more stand-offs 73 (two shown) which facilitate movement of the plate 72 along the wall 24A. That is, the stand-offs 73 operate to reduce friction as the plate 72 slides along the wall 24A under force of the bias member 76.

The striker body 74 is mounted to the plate 72 with, for example, fasteners 84 such that the striker body 74 extends generally perpendicular to the plate 72. The striker body 74 is generally wedge shaped to generally correspond with the guide chute 34 to facilitate engagement and orientation of the jig 70 with respect to the latch mechanism 26. That is, the striker 80 operates during vehicle assembly as a stand-in for the leg 54A of the striker member 50 with regards to the latch mechanism 26.

The striker 80 is supported within apertures 74A transverse to a slot 86 in the striker body 74 along a striker axis S generally parallel to the jig aperture axes JA, JB, JC. That is, the striker 80 is perpendicular the plate 72.

The bias member 76 is movably supported with respect to the striker body 74 and is spring biased toward the striker 80 by the spring 78. That is, the bias member 76 is mounted within the slot 86 generally along a bias axis B that is transverse to axis S and jig aperture axis JA, JB, JC. The bias member 76 and spring 78 may be supported along axis B by a bias member fastener 88 mounted to the striker body 74. In one disclosed non-limiting embodiment, the bias member 76 is generally "]" shaped, however, other shapes will benefit herefrom.

Figure 8:
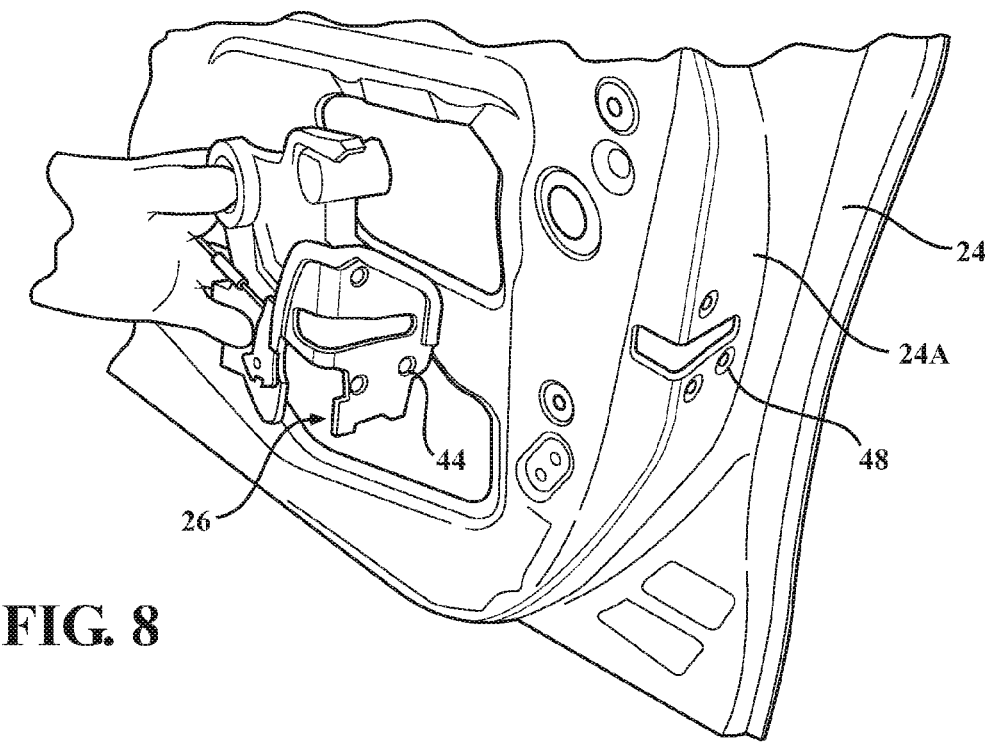
FIG. 8 is a perspective view of the vehicle door prior to insertion of the latch mechanism.
Figure 9:
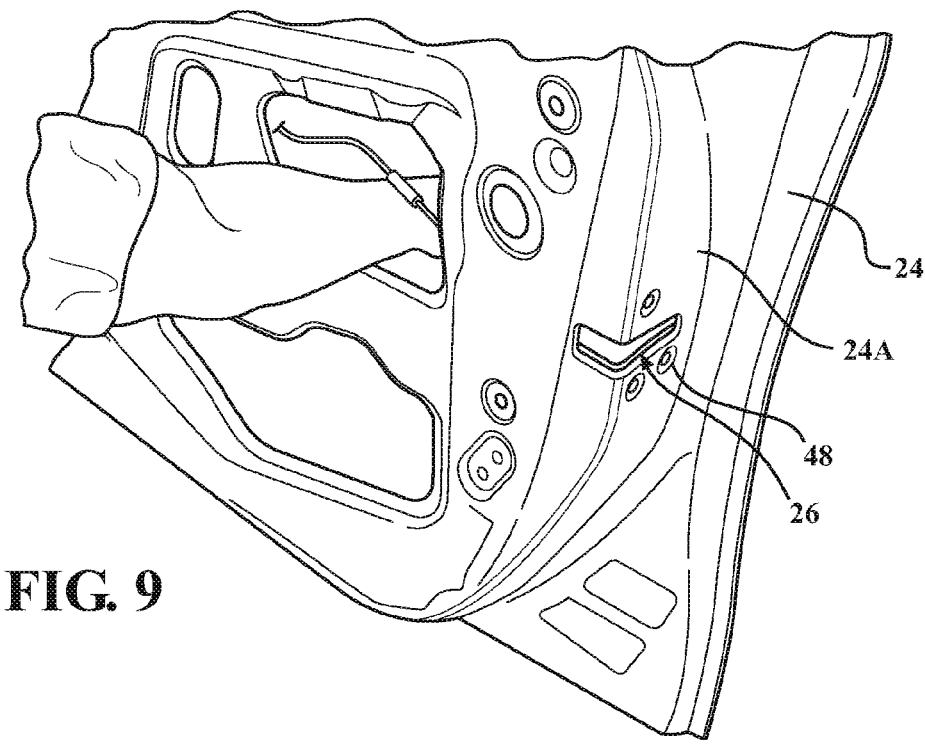
FIG. 9 is a perspective view of the latch mechanism being installed into the vehicle door.

With reference to FIG. 7, a method 100 according to one disclosed non-limiting embodiment initially includes locating the latch mechanism 26 within the door 24 on the inside of the wall 24A adjacent to the door apertures 48 (step 102; FIGS. 8 and 9). Notably, the assembler may need to blind install the latch mechanism 26 into the door 24.

Figure 10:
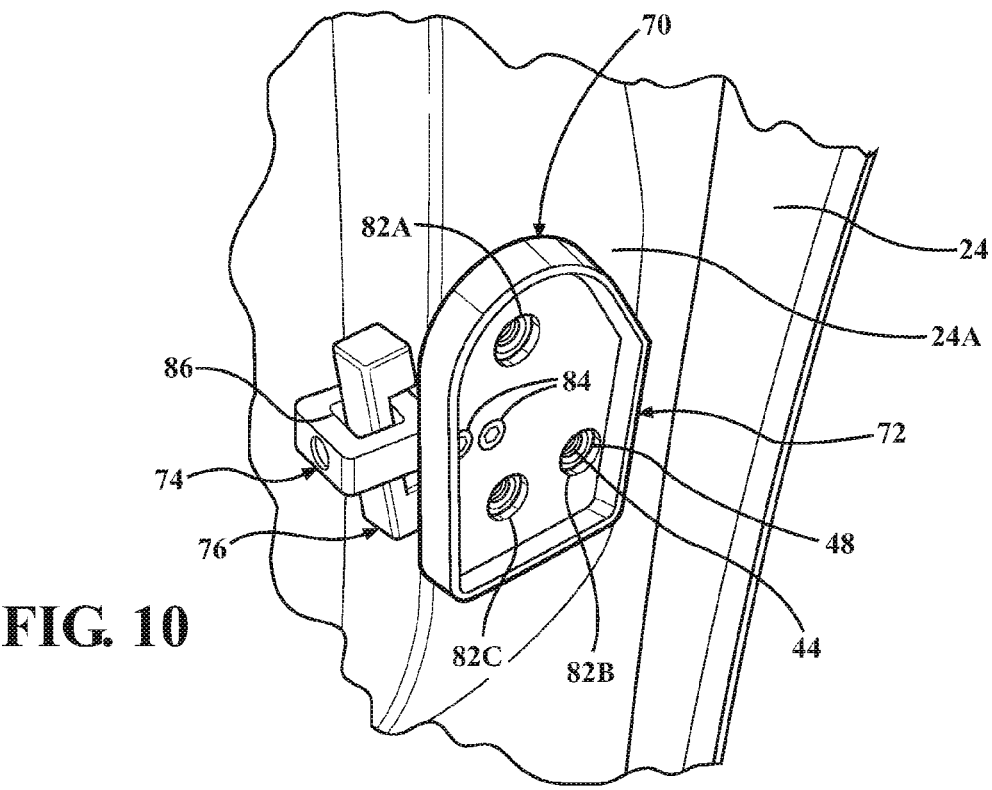
FIG. 10 is a perspective view of the jig being inserted into the latch mechanism.
Figure 11:
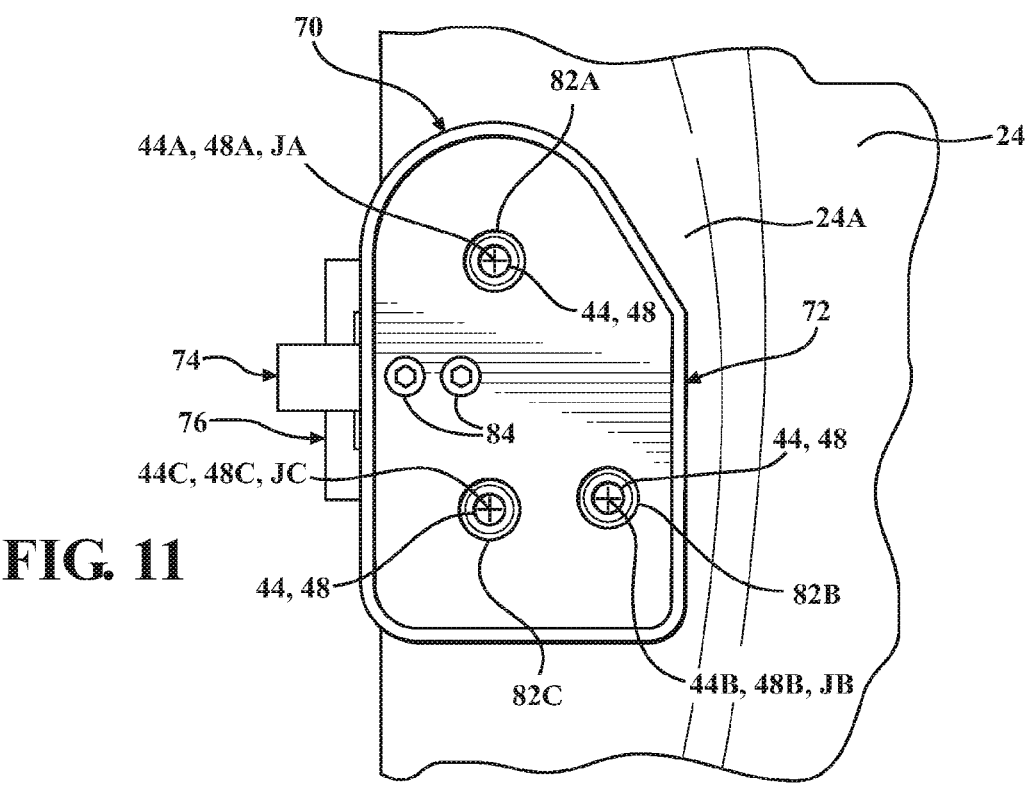
FIG. 11 is an end perspective view of the jig retained to the vehicle door and the latch mechanism.

The assembler then manually inserts the jig 70 into the latch mechanism 26 such that the plate 72 shields an outside of the wall 24A (step 104; FIG. 10). The striker 80 of the jig 70 operates as a stand in for the leg 54A of the striker member 50 with regards to the latch mechanism 26 top operate the latch ratchet 36. The latch mechanism 26 is thereby retained to the door 24. The wall 24A is sandwiched between the latch mechanism 26 and the plate 72 of the jig 70 (FIG. 11).

Figure 12:
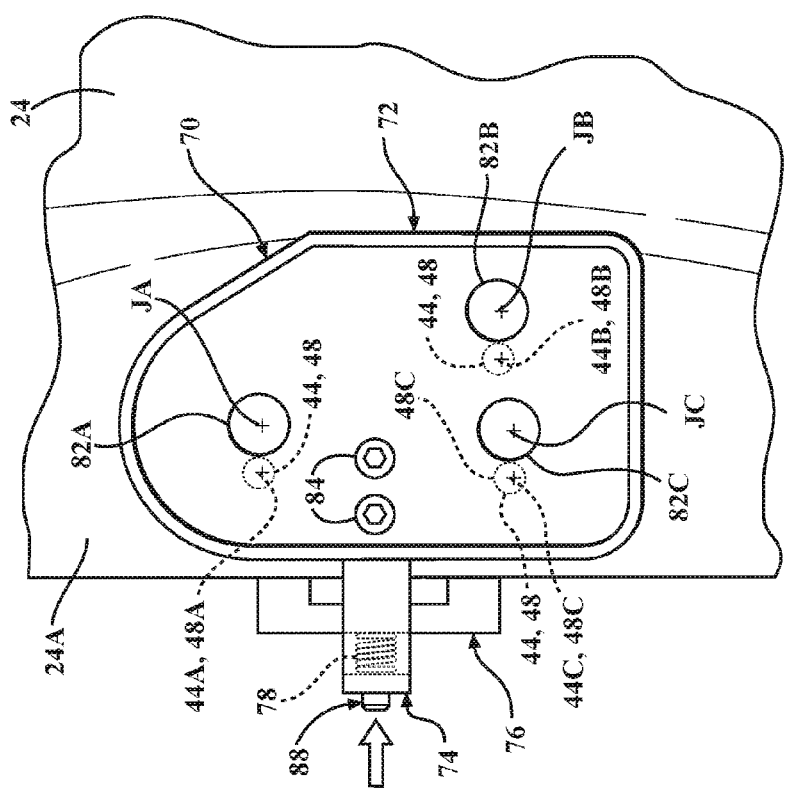
FIG. 12 is an end schematic view of the jig being inserted into the latch mechanism.

As the jig 70 is inserted into the latch mechanism 26, the bias member 76 contacts the door 24 and is displaced along the axis B away from the striker 80 as the striker 80 is engaged with the latch ratchet 36. When the jig 70 is inserted into the latch mechanism 26 by the assembler, the striker 80 is engaged with the latch ratchet 36 but the jig aperture axis JA, JB, JC may be misaligned with the latch mechanism aperture axes 44A, 44B, 44C (FIG. 12).

Figure 13:
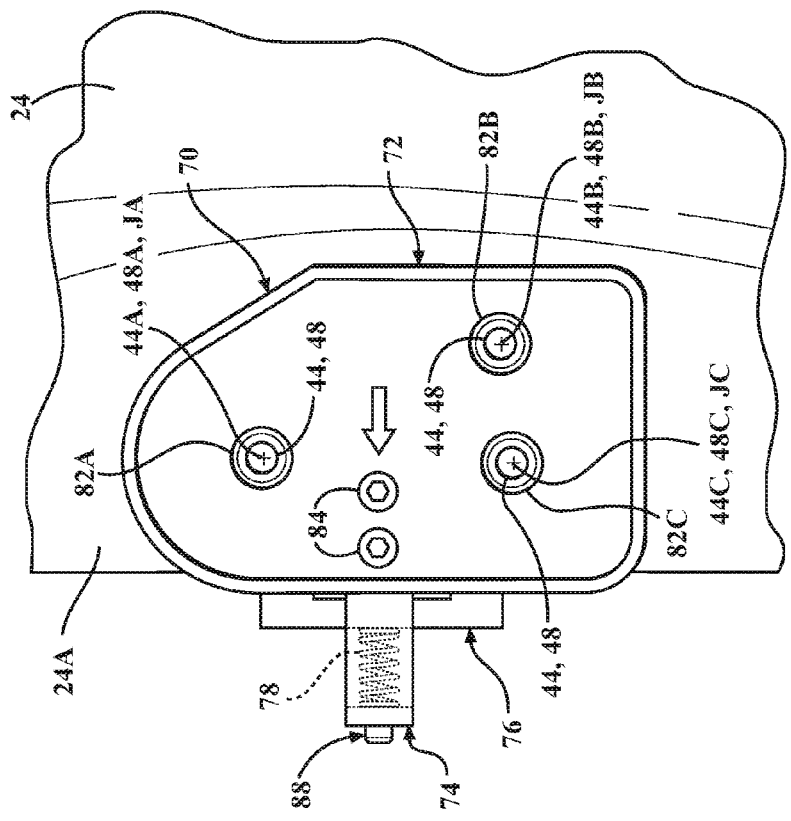
FIG. 13 is an end schematic view of the jig when released by an assembler in which the jig is aligned with the latch mechanism fastener apertures and door apertures.

Once the striker 80 has been engaged with the latch ratchet 36, the assembler releases the jig 70. The bias member 76 then biases the striker body 74 and the plate 72 with respect to the wall 24A to take up any slack between the striker 80 and the closed latch ratchet 36. This thereby aligns each respective latch mechanism aperture axes 44A, 44B, 44C with the door aperture axes 48A, 48B, 48C and jig aperture axes JA, JB, JC (FIG. 13). That is, the jig 70 self-aligns.

Figure 15:
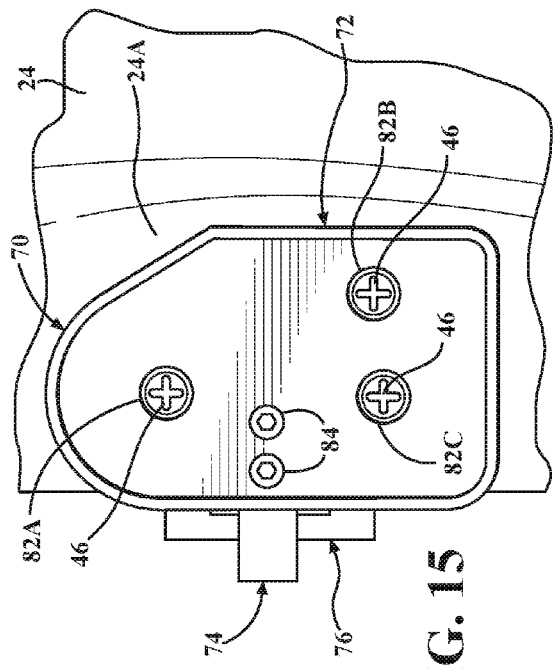
FIG. 15 is an end perspective view of the fasteners installed through the jig and into the latch mechanism to fasten the latch mechanism in the door.
Figure 14:
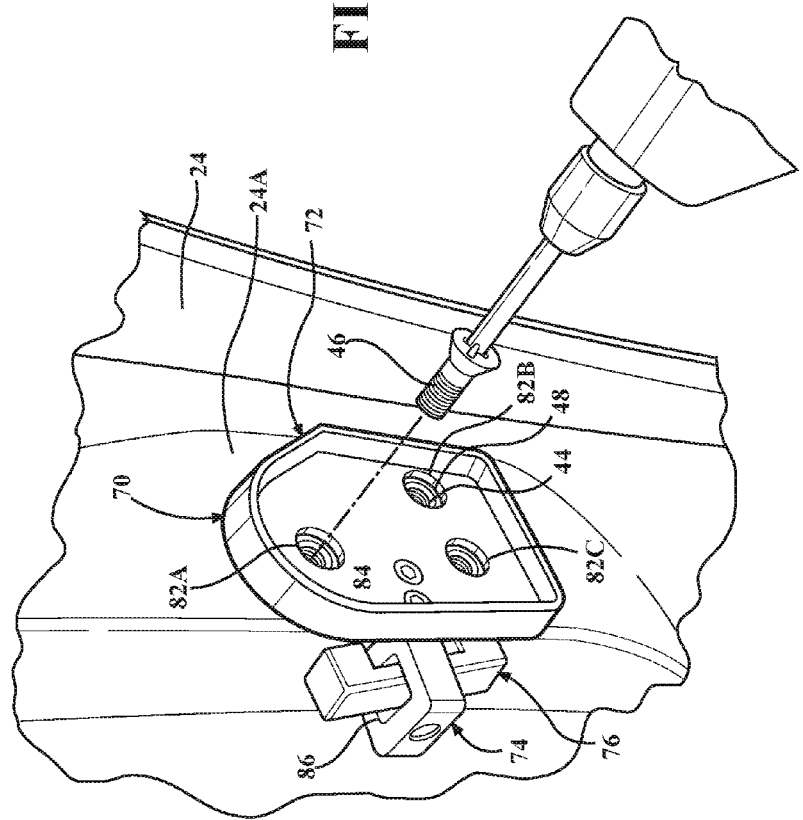
FIG. 14 is a perspective view of fasteners being installed through the jig and into the latch mechanism.

The fasteners 46 are then readily installed into the latch mechanism apertures 44 to fasten the housing 32 to the wall 24A of the door 24 while the plate 72 shields the area adjacent to the door apertures 48 (step 106; FIG. 14). The fastener heads 46H are sized to fit through the jig apertures 82A, 82B, 82C and contact the wall 24A (FIG. 15). Notably, the plate 72 shields the vehicle finish on the wall 24A from scratches and other aesthetic damage from the fastener tool etc., when the fasteners 46 are installed.

Figure 16:
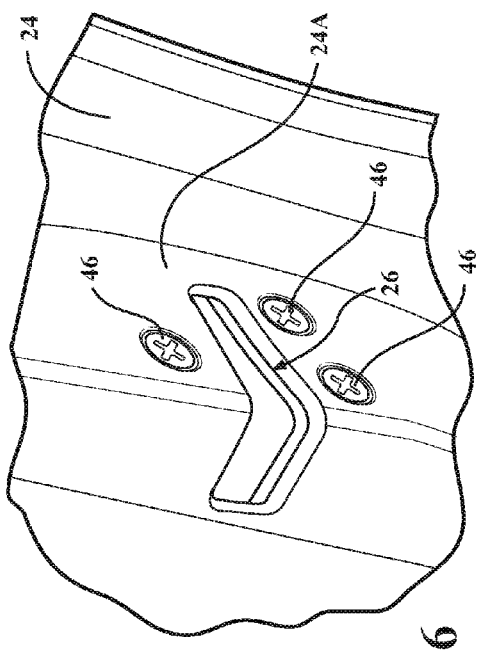
FIG. 16 is an end perspective view with the latch mechanism fastened to the door with the jig removed.

The assembler then actuates the door handle 28 to open the latch ratchet 36 and the jig 70 is released from the latch mechanism 26. (step 108; FIG. 16).

The spring-loaded jig 70 thereby self-aligns the floating latch mechanism 26 and fixed door apertures 48 which facilitates assembly and minimizes—if not eliminates—scratches and other aesthetic damage to the vehicle finish.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A jig, comprising:
   a plate with at least one jig aperture that defines a jig aperture axis;
   a striker defined along a striker axis generally parallel to said jig aperture axis; and
   a bias member movable relative to said striker axis, wherein said bias member is movably supported by a striker body mounted perpendicular to said plate.

2. The jig as recited in claim 1, further comprising a first stand-off and a second stand-off that extend from said plate toward said bias member.

3. The jig as recited in claim 1, wherein said striker is mounted to said striker body.

4. The jig as recited in claim 3, wherein said striker is a cylinder.

5. The jig as recited in claim 4, wherein said plate is manufactured of a non-metallic alloy and said striker is manufactured of a metal alloy.

6. The jig as recited in claim 3, wherein said bias member is spring biased with respect to said striker body.

7. The jig as recited in claim 6, wherein said bias member is generally "]" shaped.

8. The jig as recited in claim 6, wherein said bias member is transverse to said striker body.

9. The jig as recited in claim 1, wherein said at least one jig aperture includes three jig apertures.

10. The jig as recited in claim 1, wherein said striker body generally wedge-shaped.

11. A jig, comprising:
    a plate with a multiple of jig apertures each along a respective jig aperture axis;
    a striker body mounted to said plate;
    a striker supported by said striker body, said striker defined along a striker axis generally parallel to said aperture axis; and
    a bias member movably supported by said striker body, wherein said bias member is movable relative to said striker axis, and is spring biased with respect to said striker body.

12. The jig as recited in claim 11, wherein said bias member is transverse to said striker body.

13. The jig as recited in claim 12, wherein said at least one jig aperture includes three jig apertures.

14. A jig, comprising:
    a plate with at least one jig aperture that defines a jig aperture axis;
    a striker supported by said plate, said striker defined along a striker axis generally parallel to said jig aperture axis; and
    a bias member moveably supported by said plate relative to said striker, said bias member opposing said striker, and biased for movement towards said striker.

15. The jig as recited in claim 14, wherein said bias member extends generally perpendicular to said plate in opposition to said striker.

16. The jig as recited in claim 14, wherein said bias member is spring biased for movement towards said striker.

17. The jig as recited in claim 14, further comprising:
    a striker body mounted to said plate, wherein said striker is mounted to said striker body.

18. The jig as recited in claim 17, wherein said bias member is movably supported by said plate via said striker body.

19. The jig as recited in claim 17, wherein said striker body is generally wedge-shaped.

20. The jig as recited in claim 14, wherein said bias member is generally "]" shaped.

* * * * *